(12) United States Patent
Kozyuk et al.

(10) Patent No.: US 10,065,158 B2
(45) Date of Patent: Sep. 4, 2018

(54) DEVICE WITH AN INLET SUCTION VALVE AND DISCHARGE SUCTION VALVE FOR HOMOGENIZAING A LIQUID AND METHOD OF USING THE SAME

(71) Applicant: Arisdyne Systems, Inc., Cleveland, OH (US)

(72) Inventors: Oleg Kozyuk, North Ridgeville, OH (US); Peter Reimers, Shaker Heights, OH (US)

(73) Assignee: ARISDYNE SYSTEMS, INC., Cleveland, OH (US)

( * ) Notice: Subject to any disclaimer, the term of this patent is extended or adjusted under 35 U.S.C. 154(b) by 0 days.

(21) Appl. No.: 15/652,669

(22) Filed: Jul. 18, 2017

(65) Prior Publication Data
US 2018/0050313 A1    Feb. 22, 2018

Related U.S. Application Data

(60) Provisional application No. 62/377,229, filed on Aug. 19, 2016.

(51) Int. Cl.
*B01F 5/06* (2006.01)
*B01F 3/08* (2006.01)
(Continued)

(52) U.S. Cl.
CPC ............ *B01F 5/068* (2013.01); *B01F 3/0861* (2013.01); *F16K 21/04* (2013.01); *G05D 16/166* (2013.01); *F16K 15/04* (2013.01)

(58) Field of Classification Search
CPC .... B01F 7/0075; B01F 7/008; B01F 7/00808; B01F 7/00816; B01F 7/00833;
(Continued)

(56) References Cited

U.S. PATENT DOCUMENTS 2,435,884 A * 2/1948 Galewski .............. B01F 5/0665
366/101
3,226,029 A * 12/1965 Goodman ........... B05B 17/0692
116/137 A
(Continued)

FOREIGN PATENT DOCUMENTS

DE    10310442 A1 * 9/2004 ......... B01D 19/0094
DE    102005051072 A1 * 4/2007 ............ B01F 5/0415
(Continued)

OTHER PUBLICATIONS

The International Search Report and Written Opinion issued in corresponding International PCT Application No. PCT/US2017/042548; dated Nov. 2, 2017.

*Primary Examiner* — Charles E Cooley
(74) *Attorney, Agent, or Firm* — Pearne & Gordon LLP

(57) ABSTRACT

A homogenization device having an inlet valve, a flow-through chamber and a discharge valve. A baffle element reciprocatingly moves between an upstream portion and a downstream portion of the flow-through chamber. When the baffle element moves downstream, the inlet valve opens and liquid is admitted into the upstream portion. When the baffle element moves upstream, the inlet valve closes, the liquid in the upstream portion is pressurized and forced to flow downstream through a gap or local constriction between the outer perimeter of the baffle element and the inner surface of the chamber, causing cavitation bubbles to form and collapse.

15 Claims, 2 Drawing Sheets

(51) Int. Cl.
*F16K 21/04* (2006.01)
*G05D 16/16* (2006.01)
*F16K 15/04* (2006.01)

(58) Field of Classification Search
CPC .......... B01F 7/00358; B01F 2215/0431; B01F 5/068; B01F 3/0861; B01J 19/008; B01J 19/10; B01J 2219/0877; G05D 16/166; F16K 21/04; F16K 15/04
USPC ................................. 366/264, 302, 304, 305
See application file for complete search history.

(56) References Cited

U.S. PATENT DOCUMENTS

| | | | | |
|---|---|---|---|---|
| 3,473,787 A * | 10/1969 | Bartlett | ................ | B01F 5/0665 366/136 |
| 4,127,332 A | 11/1978 | Thiruvengadam et al. | | |
| 4,189,101 A * | 2/1980 | Hughes | ................ | B05B 17/0692 137/808 |
| 5,492,654 A * | 2/1996 | Kozjuk | ................ | B01F 5/061 261/76 |
| 5,723,518 A * | 3/1998 | Kahl | ................ | B01F 3/0811 427/427.4 |
| 5,810,052 A * | 9/1998 | Kozyuk | ................ | B01F 3/0811 138/37 |
| 5,937,906 A * | 8/1999 | Kozyuk | ................ | B01F 5/0661 138/37 |
| 5,969,207 A * | 10/1999 | Kozyuk | ................ | C10G 9/00 208/106 |
| 5,971,601 A * | 10/1999 | Kozyuk | ................ | B01F 3/0811 138/40 |
| 6,012,492 A * | 1/2000 | Kozyuk | ................ | B01F 5/0661 138/37 |
| 6,035,897 A * | 3/2000 | Kozyuk | ................ | B01F 5/0661 138/37 |
| 6,502,979 B1 * | 1/2003 | Kozyuk | ................ | B01F 5/0665 366/176.2 |
| 6,802,639 B2 * | 10/2004 | Kozyuk | ................ | B01F 5/0662 366/176.2 |
| 6,935,770 B2 * | 8/2005 | Schueler | ................ | B01F 5/0256 366/174.1 |
| 7,041,144 B2 * | 5/2006 | Kozyuk | ................ | B01D 9/005 23/295 R |
| 7,086,777 B2 * | 8/2006 | Kozyuk | ................ | B01F 5/0665 366/176.2 |
| 7,207,712 B2 * | 4/2007 | Kozyuk | ................ | B01F 3/0807 138/40 |
| 7,247,244 B2 * | 7/2007 | Kozyuk | ................ | C02F 1/72 210/748.13 |
| 7,314,306 B2 * | 1/2008 | Kozyuk | ................ | B01F 5/0681 366/176.2 |
| 7,338,551 B2 * | 3/2008 | Kozyuk | ................ | B01F 3/0446 261/123 |
| 7,708,453 B2 * | 5/2010 | Kozyuk | ................ | B01F 5/0665 138/42 |
| 7,833,421 B2 * | 11/2010 | Huymann | ................ | C02F 1/34 210/748.01 |
| 8,002,971 B2 * | 8/2011 | Kozyuk | ................ | C10G 27/12 138/137 |
| 8,759,278 B2 | 6/2014 | Corominas et al. | | |
| 9,290,717 B1 * | 3/2016 | Kozyuk | ................ | C11B 3/16 |
| 9,682,356 B2 * | 6/2017 | Kravtsov | ................ | B01J 19/008 |
| 9,776,159 B2 | 10/2017 | Kozyuk | | |
| 2003/0147303 A1 * | 8/2003 | Schueler | ................ | B01F 5/0256 366/176.2 |
| 2004/0042336 A1 * | 3/2004 | Kozyuk | ................ | B01F 5/0665 366/167.1 |
| 2004/0071044 A1 * | 4/2004 | Kozyuk | ................ | B01F 5/0681 366/176.2 |
| 2004/0251566 A1 * | 12/2004 | Kozyuk | ................ | B01F 3/0446 261/76 |
| 2005/0083779 A1 | 4/2005 | Grandi et al. | | |
| 2006/0027100 A1 * | 2/2006 | Kozyuk | ................ | B01F 3/0446 95/260 |
| 2006/0050608 A1 * | 3/2006 | Kozyuk | ................ | B01F 3/0807 366/176.2 |
| 2006/0193199 A1 * | 8/2006 | Kozyuk | ................ | B01F 5/0681 366/176.2 |
| 2007/0041266 A1 * | 2/2007 | Huymann | ............ | B01F 3/0446 366/162.4 |
| 2007/0205307 A1 * | 9/2007 | Kozyuk | ................ | B01F 3/0807 239/518 |
| 2008/0194868 A1 * | 8/2008 | Kozyuk | ................ | B01D 9/005 562/466 |
| 2010/0329073 A1 * | 12/2010 | Malmberg | ................ | A01J 11/16 366/176.3 |
| 2013/0150280 A1 | 6/2013 | Corominas et al. | | |
| 2014/0177382 A1 * | 6/2014 | Malmberg | ................ | A01J 11/16 366/176.2 |
| 2015/0315478 A1 * | 11/2015 | Hanks | ................ | C10G 1/00 208/390 |
| 2015/0315494 A1 * | 11/2015 | Hanks | ................ | C10G 69/02 252/373 |
| 2015/0315497 A1 * | 11/2015 | Hanks | ................ | C10G 69/06 252/372 |
| 2016/0175791 A1 | 6/2016 | Kozyuk | | |
| 2016/0279538 A1 * | 9/2016 | Kozyuk | ................ | B01D 19/0094 |
| 2017/0291150 A1 * | 10/2017 | Kozyuk | ................ | B01F 5/0068 |
| 2018/0050313 A1 * | 2/2018 | Kozyuk | ................ | B01F 3/0861 |

FOREIGN PATENT DOCUMENTS

| | | | | |
|---|---|---|---|---|
| RU | 2032456 C1 * | 4/1995 | ............ | B01F 5/0646 |
| SU | 1088782 A1 * | 4/1984 | ............ | B01F 5/0647 |
| SU | 1673183 A1 * | 8/1991 | ............ | B01F 5/0665 |
| SU | 1747133 A1 * | 7/1992 | ............ | B01F 5/0661 |

* cited by examiner

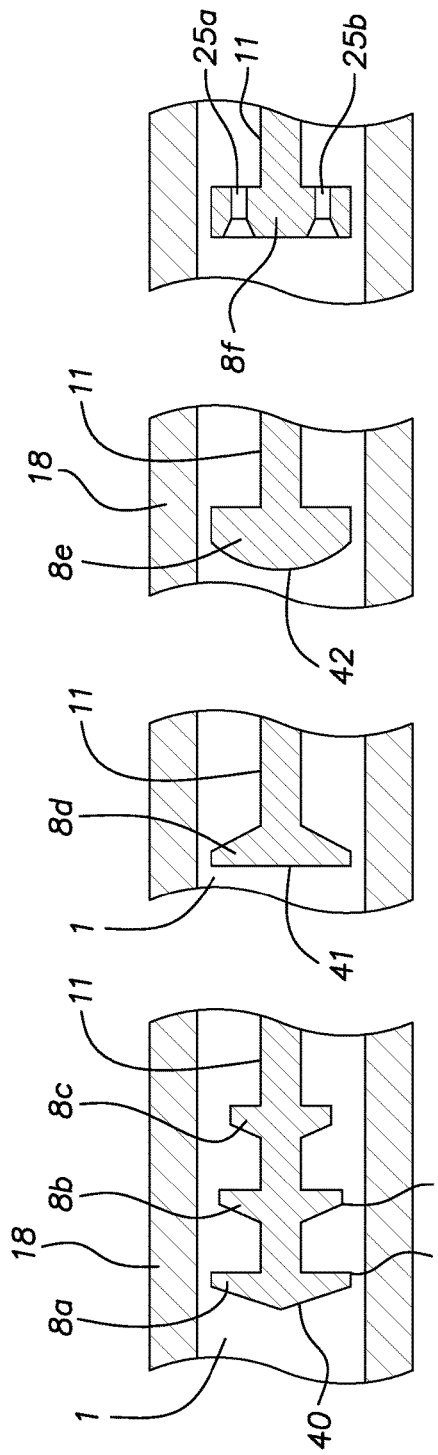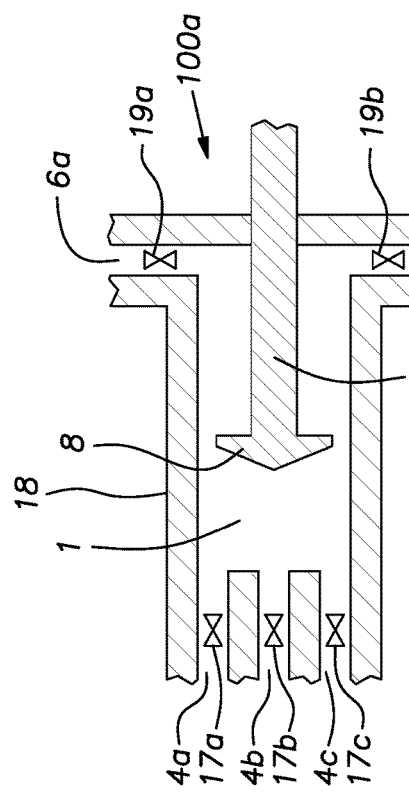

DEVICE WITH AN INLET SUCTION VALVE AND DISCHARGE SUCTION VALVE FOR HOMOGENIZAING A LIQUID AND METHOD OF USING THE SAME

This application claims the benefit of U.S. provisional patent application Ser. No. 62/377,229 filed Aug. 19, 2016, the contents of which are incorporated herein in their entirety by reference.

FIELD

This invention relates to a homogenization device for treating a liquid, and optionally with the aid of hydrodynamic cavitation. The homogenization device can find application in the chemical, food, cosmetic, pharmaceutical and other industries.

BACKGROUND

There are many known methods and devices for producing dispersed liquid systems, for example, suspensions and emulsions, using the effect of hydrodynamic cavitation. In these methods, the emulsification and dispersion processes go on as a result of cavitation influences purposely created in the processing flow by the hydrodynamic course of the passage of the flow through a localized constriction. The mixing, emulsifying and dispersing influences of hydrodynamic cavitation can occur as a result of powerful influences on the processed components under the collapse of the formed cavitation bubbles.

In the field of the treating of liquid systems with cavitation, it is known that various homogenization devices using the effect of hydrodynamic cavitation can be used. Typical of the art are those devices disclosed in U.S. Pat. Nos. 4,127,332; 5,810,052; 5,971,601; 6,802,639; 6,935,770; 7,207,712; and 8,759,278. The homogenization devices disclosed in the aforementioned patents have proven efficient and useful for treating or forming disperse liquid systems. However, the use of prior devices requires additional pumps for pressurizing process liquids for efficiently treating or forming liquid systems with cavitation, which leads to energy losses during processing.

The present invention provides a novel and improved homogenization device for treating liquids, preferably with cavitation, to form liquid disperse systems in a simple design. The device can be operated without additional pumps, including priming pumps, for pressurizing process liquids.

SUMMARY

In a first aspect, there is a homogenization device that includes a housing, the housing defines a flow-through chamber having an upstream portion, a downstream portion and an inner surface; an inlet port having an inlet valve for introducing liquid into the upstream portion of the flow-through chamber; a baffle element, the baffle element being disposed coaxially within the flow-through chamber, the baffle element being moveable within the flow-through chamber between the upstream portion and the downstream portion; and a local constriction positioned between the baffle element and the inner surface of the flow-through chamber to provide fluid communication between the upstream portion and the downstream portion of the flow-through chamber, wherein the inlet valve is capable of actuating between an open position and a closed position and the inlet valve being actuated to a closed position as the baffle element moves in an upstream direction.

In some examples of aspect 1, the upstream portion of the flow-through chamber is upstream of baffle element, for example, the front surface of the baffle element or leading edge of the portion of the baffle element at the formation of the local constriction.

In another example of aspect 1, the flow-through chamber is cylindrical.

In another example of aspect 1, the inlet valve is a suction valve. The suction valve can include a ball and retaining or stop plate such that the ball is capable of moving in the suction valve to actuate the valve between an open position and a closed position, wherein the open position admits or permits the introduction of liquid into the flow-through chamber and the closed position prevents liquid from flowing into the flow-through chamber through the inlet valve.

In another example of aspect 1, the device includes a discharge valve for discharging fluid from the flow-through chamber and out of the device.

In another example of aspect 1, the discharge valve is a suction valve. The suction valve can include a ball and retaining or stop plate such that the ball is capable of moving in the suction valve to actuate the valve between an open position and a closed position, wherein the open position permits the discharge of liquid out of the flow-through chamber and the closed position prevents liquid from flowing out of the flow-through chamber through the discharge valve.

In another example of aspect 1, the baffle element is mounted on a rod which extends into the flow-through chamber. For example, the rod can extend into the flow-through chamber from an end wall of the chamber positioned downstream of the baffle element.

In another example of aspect 1, a reciprocating mechanism is connected to the rod, the reciprocating mechanism being capable of reciprocating the rod within the flow-through chamber. For example, the rod can be actuated between a first position and a second position in the chamber. In another example, the rod can be reciprocated between a first position and a second position in the chamber.

In another example of aspect 1, the inlet valve is capable of being actuated to an open position to admit liquid into the flow-through chamber as the baffle element moves in a downstream direction or away from the inlet valve.

In another example of aspect 1, the device includes two baffle elements disposed coaxially in the flow-through chamber. For example, the two baffle elements can be arranged coaxially in series in the flow-through chamber such that two local constrictions are present in the chamber.

In another example of aspect 1, the baffle element includes a structural element selected from the group consisting of: a conical-shaped front upstream surface, a flat front upstream surface, or a front upstream spherical surface. For example, the upstream surfaces of the structural elements are upstream-facing elements in the flow-through chamber.

In another example of aspect 1, the local constriction is an annular gap between the baffle element and the inner surface of the flow-through chamber, the annular gap having a constant or average width in the range of 1 micron to 20 mm.

In another example of aspect 1, the local constriction is a gap between the outermost perimeter surface of the baffle element and inner surface of the flow-through chamber radially opposed to the perimeter surface of the baffle element. The gap can have a constant or average width in the range of 1 micron to 20 mm.

In another example of aspect 1, the baffle element includes a flow channel having an orifice therein and the flow channel provides fluid communication between the upstream portion and the downstream portion of the flow-through chamber.

In another example of aspect 1, the device includes a second inlet port having a second inlet valve for introducing liquid into the flow-through chamber.

In another example of aspect 1, the second inlet valve is a suction valve. The suction valve, in one example, can be the same as the first inlet valve.

In another example of aspect 1, the device includes a second discharge valve for discharging fluid from the flow-through chamber.

In another example of aspect 1, the second discharge valve is a suction valve. The suction valve, in one example, can be the same as the first discharge valve.

In a second aspect, there is a method for homogenizing a liquid, the method includes the steps of (a) providing a homogenization device according to aspect 1; (b) moving the baffle element in a downstream direction away from the inlet valve to actuate the inlet valve into an open position and thereby admitting liquid into the flow-through chamber through the inlet valve; (c) moving the baffle element in an upstream direction towards the inlet valve to pressurize the liquid in the upstream portion of the flow-through chamber and force the liquid through the local constriction to form cavitation bubbles downstream of the local constriction.

In some examples of aspect 2, the movement of the baffle element in the upstream direction actuates the inlet valve from the open position to a closed position.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

The accompanying drawing is included to provide a further understanding of principles of the disclosure, and is incorporated in and constitutes a part of this specification. The drawing illustrates some examples(s), and together with the description serves to explain, by way of example, principles and operation thereof. It is to be understood that various features disclosed in this specification and in the drawing can be used in any and all combinations. By way of non-limiting example the various features may be combined with one another as set forth in the specification, above, as aspects.

BRIEF DESCRIPTION OF THE DRAWINGS

The above and other features, examples and advantages of aspects of the examples disclosed in the present specification are better understood when the following detailed description thereof is read with reference to the accompanying drawings, in which:

FIG. 2A is a schematic of a section view of a homogenization device having a baffle element.

FIG. 2B is a schematic of a section view of a homogenization device having a baffle element.

FIG. 2C is a schematic of a section view of a homogenization device having a baffle element.

FIG. 2D is a schematic of a section view of a homogenization device having a baffle element.

FIG. 3 is a schematic of a longitudinal section view of a homogenization device having a single cone-shaped baffle element.

DETAILED DESCRIPTION

Figure 1:
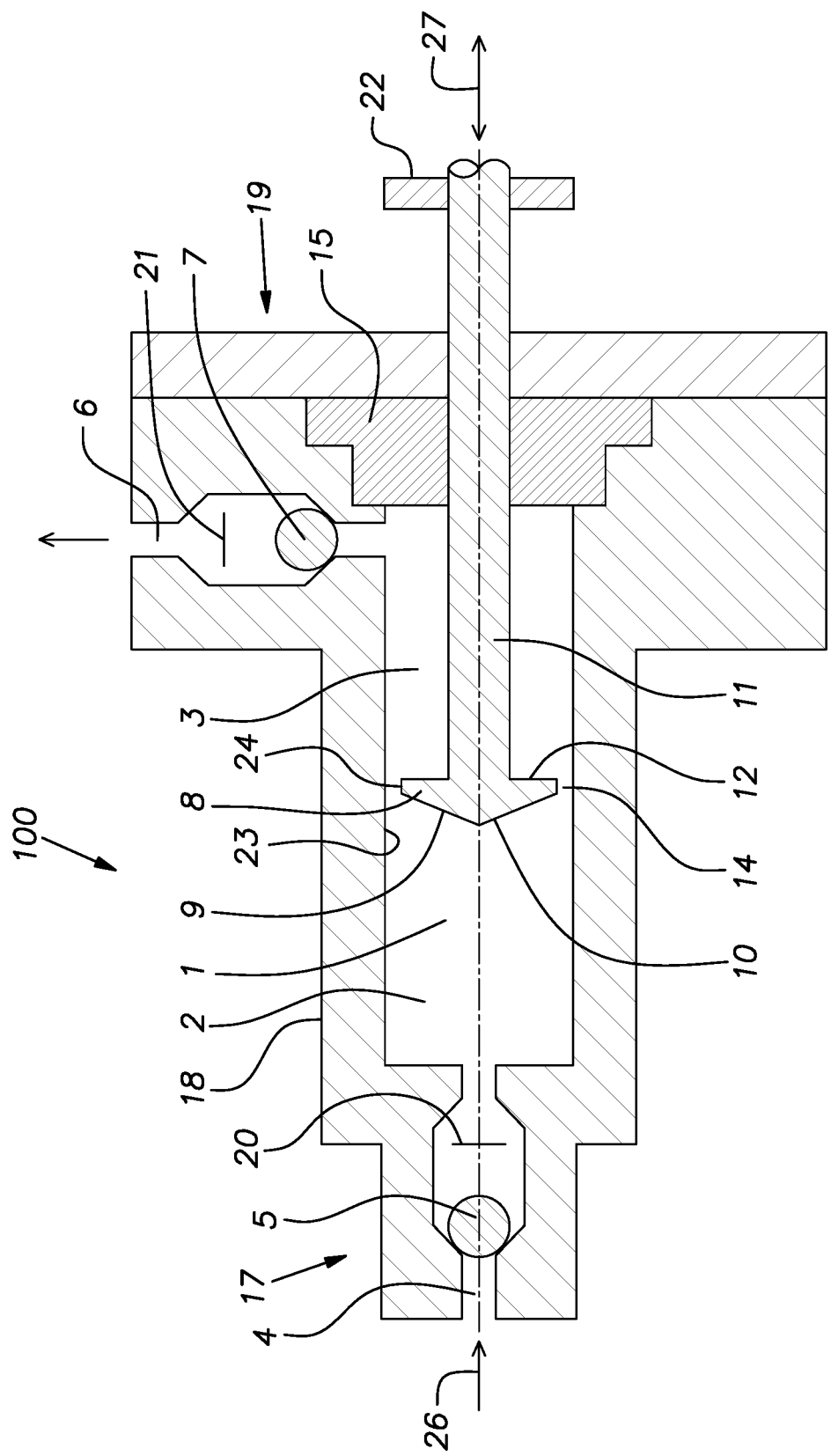
FIG. 1 is a schematic of a longitudinal section view of a homogenization device having a single cone-shaped baffle element.

Herein, when a range such as 5-25 (or 5 to 25) is given, this means preferably at least 5 and, separately and independently, preferably not more than 25. In an example, such a range defines independently not less than 5, and separately and independently, not less than 25.

With reference to FIG. 1, there is shown a homogenization device 100, which includes a housing 18 that defines a flow-through chamber 1 having an upstream portion 2 and a downstream portion 3. As shown, the flow-through chamber 1 can have a cylindrical shape. In one or more embodiments, the chamber 1 can have a shape in lateral cross section of a square, rectangle, oval, ellipse, triangle, polygon or any other shape. The flow-through chamber 1 can have a constant diameter along its length, for example, from the outlet area of the inlet valve 17 to the entrance of the discharge valve 19. The shape of the baffle element 8 (described below) will correspond to the shape of the chamber 1 and the gap 14 (see below) will correspond regardless of the shape. Flow-through chamber 1 has an inlet port 4 for introducing fluid into the chamber 1. The inlet port 4 is in fluid connection with an inlet valve, which can be a suction valve as shown, 17 for introducing liquid into upstream portion 2 of chamber 1. Flow-through chamber 1 has a discharge port 6 for discharging fluid from the chamber 1. The discharge port 6 is in fluid connection with a discharge valve, which can be a suction valve as shown, 19 for discharging liquid from downstream portion 3 of chamber 1.

In one or more embodiments, the inlet valve and discharge valve are suction valves that interact with the movement of the baffle 8. Other valves known in the art can be used, such as poppet valves, check valves and one-way valves (not shown). As shown, suction valve 17 includes a ball 5 and a blocking or retaining plate 20. The ball 5 and plate 20 are arranged in the chamber of the valve with plate 20 downstream of ball 5. The ball 5 can move within the inlet valve chamber between inlet port 4 and plate 20. The ball 5 can have a diameter larger than the outlet of inlet port 4 for blocking or preventing fluid flow into the inlet valve once ball 5 is positioned against the outlet of inlet port 4.

Discharge valve 19 is shown as including a ball 7 and a blocking or retaining plate 21. The ball 7 and plate 21 are arranged in the chamber of the valve with plate 21 downstream of ball 7. The ball 7 can move within the outlet valve chamber between the exit port from chamber 1 and plate 20. The ball 7 can have a diameter larger than the exit port from chamber 1 for blocking or preventing fluid flow into the discharge valve once ball 7 is positioned against the exit outlet of flow-through chamber 1.

Device 100 includes at least one baffle element 8 coaxially disposed within flow-through chamber 1 and reciprocatingly movable axially within flow-through chamber 1 between upstream portion 2 and downstream portion 3 as shown in the figures.

Baffle element 8 includes a front surface 9, for example, a conically-shaped front surface. As shown, tapered portion 10 of conically-shaped front surface 9 confronts the liquid or fluid flow moving through chamber 1. A rod 11 is secured or mounted to a base portion 12 of baffle element 8, for example, the base portion can have back face opposite the front surface 9. Rod 11 is slidably and coaxially mounted to flow-through chamber 1 and is powered to reciprocatingly move within said flow-through chamber 1 between said upstream portion 2 and said downstream portion 3. Rod 11 is connected to a reciprocating mechanism 22 for reciprocating axial movement of rod 11 relative to and longitudinally within flow-through chamber 1. Such reciprocating mechanism 22 can be a crankshaft, hydro motor or actuator and may be powered by a mechanical, hydraulic, pneumatic, electric, electromechanical or electromagnetic power source. Rod 11 can alternatively be reciprocated by fluid flowing into and out of the device.

Seal 15 provides a seal between the rod 11 and flow-through chamber 1. The seal 15 must withstand pressures generated within the chamber 1, e.g., the downstream portion 3 of the flow-through chamber 1. As shown, seal 15 is positioned at the back, downstream end of chamber 1 and forms an internal wall of the chamber 1. Seal 15 can be made of any suitable material, e.g., Teflon, elastomer, plastic, or the like.

Baffle element 8 forms a local constriction 14 in the chamber 1 which provides fluid communication between upstream portion 2 and downstream portion 3 as shown in the figures. For reference, upstream portion 2 is the portion of chamber upstream of baffle 8 and downstream portion 3 is the portion of the chamber downstream of baffle 8. As the baffle reciprocates in chamber 1, the volumes of the upstream and downstream portions vary.

Local constriction 14 can be, for example, an annular orifice or nozzle defined between the inner surface or wall 23 of flow-through chamber 1 and baffle element 8. The outer perimeter 24 of baffle element 8 preferably defines a cylinder having a length or extension (in a direction parallel to the longitudinal axis of chamber 1) of preferably 0.2-100 mm or more, preferably 0.4-60, 0.7-30, 1-15, 2-10, 3-8 or 4-6, mm, and having a diameter of preferably 5-1000 mm or more, preferably 10-800, 20-650, 40-500, 70-300, 100-200 or about 150, mm. A very narrow gap or local constriction 14 is defined around baffle element 8 and between outer perimeter 24 and the inner wall or surface 23 of flow-through chamber 1. Gap/local constriction 14 is preferably 1-1000, 2-500, 4-250, 5-100, 7-50 or 10-20, microns, alternatively not more than 2, 5, 10, 20, 30, 50, 80 or 100 mm; optionally more than 100 mm, all the way around the outermost perimeter surface (e.g., 24) of baffle element 8. As the baffle 8 reciprocates back and forth along the length of the chamber 1, the local constriction or gap dimensions (e.g., distance between inner wall 23 and perimeter 24) preferably remain constant.

Baffle element 8 may have various shapes, sizes and numbers as shown in the corresponding FIGS. 2a-2d. Each baffle element 8 a-f is configured to generate hydrodynamic cavitation bubbles in the field downstream therefrom when the baffle element is moved into the upstream portion 2 of the flow-through chamber 1. The movement of the baffle to generate hydrodynamic cavitation in chamber 1 denotes that the baffle is non-static or a non-moving cavitation generating element within the device. The cavitation bubbles are created in a cavitation zone in and directly downstream of the local constriction. The cavitation bubbles collapse in the downstream portion under an increase in pressure as the baffle reciprocates and builds pressure in the downstream portion as it moves away from the inlet port.

Each baffle element 8 a-f functions like baffle element 8 and defines a gap like gap 14. Along rod 11 can be fixed or mounted a plurality of baffle elements as shown in FIG. 2a, such as 2, 3, 4, 5, 6, 7, 8, 9, 10 or more baffle elements, for example, arranged in series. The gap 14 around each of these baffle elements can be the same, or can vary. For example, the gap 14 around the first or lead baffle (e.g., baffle 8a) can be a certain distance, and the gap 14 around the next baffle (e.g., baffle 8b) can be larger, and the gap 14 can get progressively larger as you get to each successive baffle until you get to the last baffle (e.g. baffle 8c), which has the largest gap 14. Alternatively, the gap 14 can get progressively smaller as you go from the lead baffle to the last baffle. Alternatively, the gap 14 can randomly get smaller or larger (i.e., a mixture) as you go from the lead baffle to the last baffle.

In FIG. 2a, baffle elements 8a, 8b and 8c have a conically-shaped front surface 40, whereas baffle elements 8b and 8c include rod 11 as part of the front surface extending to the next upstream baffle element (e.g., element 8a for element 8b). In FIG. 2b, baffle element 8d has a flat front surface 41, which surface is perpendicular to the general fluid flow direction (e.g., arrow 26 of FIG. 1) through chamber 1. In FIG. 2c, baffle element 8e has a curved front surface 42 defining a portion of a sphere.

The distance or gap between the back edge 30 of the outer perimeter 24 of one baffle and the front edge 31 of the outer perimeter 24 of the next baffle is preferably 5-500 mm or more, for example, the gap can be in the range of 10-300, 30-200, 50-100, 60-80, or about 70 mm.

Optionally, a baffle element can have 1, 2, 3, 4, 5, 6, 7, 8, 9, 10 or more openings or orifices therethrough, such as holes or orifices 25a, 25b provided in baffle element 8f as shown in FIG. 2d. The one or more openings provide further fluid communication between the upstream and downstream portions of the flow-through chamber. The one or more openings also can provide means for generating further hydrodynamic cavitation as fluid flows through these openings/orifices. Each opening/orifice 25a, 25b is preferably cylindrical with a diameter of at least 0.1, 0.3, 0.5, 1, 5, 10, 15, 20, 30, 40, 50 or 60 mm or more, preferably 0.1-60 mm or more. The openings or orifices in a baffle element are preferably spaced apart equally around the face of the baffle element outside the center diameter where the rod is mounted. All the orifices in one baffle can be the same size/diameter or can be a mixture of different sizes/diameters. When there is a plurality of baffle elements on a rod 11, optionally some can have orifices and some cannot have orifices.

In the operation of homogenization device 100, for example as shown in FIG. 1, a process fluid or liquid stream is introduced in the direction shown by arrow 26 into inlet port 4, through inlet valve 17 and then into the upstream portion of flow-through chamber 1. Reciprocating mechanism 22 drives rod 11 forwards and backwards in chamber 1, in the directions shown by double arrow 27, so that baffle element 8 reciprocates back and forth between upstream portion 2 and downstream portion 3 as shown. When baffle element 8 is driven backwards or downstream towards seal 15 and towards and into downstream portion 3 and away from upstream portion 2, this draws, sucks, admits or permits process liquid through inlet port 4, through inlet valve or suction valve 17 (which opens or is caused to open) and into upstream portion 2; this motion also pushes process liquid downstream and towards seal 15, which forces process liquid through discharge valve 19 (which is caused to open) and out through discharge port 6.

In operation, when baffle element 8 is driven upstream or towards inlet valve 17 and upstream portion 2, thereby decreasing the fluid volume in the upstream portion, this causes inlet valve or suction valve 17 to close, so that process liquid in upstream portion 2 is pressurized to a higher or desired pressure; this motion of baffle element 8 also closes discharge valve 19. This motion of baffle element 8 and the pressurization of liquid in upstream portion 2 forces process liquid to flow from upstream portion 2 through gap or local constriction 14 (and through optional orifices 25a, 25b) into downstream portion 3. As the process liquid passes through the local constriction 14 (and through optional orifices 25a, 25b), an instantaneous pressure drop to less than atmospheric pressure occurs, causing a shearing action and causing cavitation bubbles to form adjacent and/or downstream of the baffle element 8 and thereafter collapse.

As shown in FIG. 1, as baffle 8 moves in the upstream direction and forces liquid against inlet valve 17, thereby increasing pressure there against, ball 5 is actuated from an open position (e.g., against plate 20) to a closed position as it moves to and rests against inlet port 4, thereby preventing fluid from flowing into the chamber 1. In a similar manner, as baffle 8 moves in a downstream portion and draws fluid away from inlet valve 17, thereby reducing pressure there against, ball 5 is actuated away from the inlet port to a downstream portion of the valve (e.g., against plate 20), thereby permitting fluid to enter the valve and chamber 1. The same actuation process, in a reverse manner, occurs in discharge valve 19 as the baffle reciprocates in chamber 1.

Preferably the process fluid or liquid in upstream portion 2 is pressurized to a pressure in the range of 100 to 50,000 or even 100,000 psi, for example, to a pressure of at least 200, 400, 700, 1000, 1500, 2000, 3000, 4000, 7000, 10000, 20000 or 30000, psi.

The pressure of the incoming liquid at the inlet port 4 can be, for example, 0.1-1000 psi or more, such as 0.5-500, 1-400, 5-100, psi.

Regarding baffle element 8, a full movement forwards (towards port 4) plus a full movement backwards equals one stroke. The baffle element(s) preferably reciprocate at a rate of 1-6000, 2-4000, 3-2000, 5-1000, 8-800, 10-400, 20-200, 30-150, 40-100, 50-80 or 60-70, strokes per minute. The stroke distance, from closest approach to seal 15 to farthest distance away from seal 15, is preferably 2-200 (or more), 4-100, 5-80, 10-40, 15-30, or about 20, cm. The baffle is preferably ceramic or metal, such as stainless steel, titanium or tungsten carbide.

During the collapse of the cavitation bubbles, high localized pressures, up to 1000 Mpa, arise, turning out intensive dispersing influences on the process liquid. The level of energy dissipation in the cavitation zone attains a magnitude in the range of $1^{10}$-$1^{15}$ watt/kg, thereby allowing the production from the process liquid of very finely dispersed emulsions and dispersions.

After passage through the cavitation bubbles zone, the flow of processed fluid or liquid is accumulated in the downstream portion 3. The following motion of baffle element 8 towards seal 15 forces processed fluid or liquid through discharge valve 19 and discharge port 6.

FIG. 3 shows an alternative embodiment wherein the device 100a has a plurality of inlet ports 4a, 4b, 4c, (the same or similar to inlet port 4) having inlet valves or suction valves 17a, 17b, 17c, (the same or similar to inlet valve 17) respectively. Optionally there can be 2, 3, 4, 5, 6, 7, 8, 9, 10 or more inlet ports with respective inlet or suction valves, the sizes/capacities of which can be the same or different. Each inlet port can be for a different fluid or liquid, to permit mixing of different fluids/liquids in the chamber 1. The device 100a can also have 2, 3, 4, 5, 6, 7, 8, 9, 10 or more discharge ports having respective discharge valves, to increase capacity; see discharge ports 6a, 6b with respective discharge valves 19a, 19b, which are the same or similar to port 6 and valve 19.

The process liquids which can be used in the present invention include water, aqueous liquids, organic liquids and mixtures thereof. The organic liquids can be low, medium and high molecular weight liquids, such as monomers, polymers, oligomers, plant oils, fats, resins and mixtures thereof. The process liquids can be any liquids which are presently used in the art of hydrodynamic cavitation.

The liquids can be comprised of a mixture of two or more liquids such as one liquid soluble in or miscible with another liquid as well as mutually insoluble or immiscible liquids, for example, in the form of emulsions. Furthermore, the liquids used in the invention can carry solid or semisolid particles or mixtures thereof. For example, the liquid can carry particles which act as a reactant, a filler or a catalyst. Mixtures of different particles can be carried by the liquid. The liquid can also carry a gaseous component, such as air, oxygen, nitrogen or carbon dioxide.

The present invention can be used with respect to the following reactions: preparation of high purity, narrow size distribution nanoparticles and emulsions with uniform shapes; improvement of the performance of phase transfer catalysts and the reactivity of catalysts or reagents; degassing of the liquids and hydrolysis of non-hydratable phospholipids in oil, promote conversion of dissolved calcium and bicarbonate ions into calcium carbonate and microbial cell disruption, treatment of various bio-fuels, increases in both yield and temperature, producing a filled resin to provide electrically and thermally conductive materials.

More specifically, the present invention relates to a reaction and processes method which are effective and useful in the fields of chemistry, electronic materials, biochemistry, agriculture, medication, and the pharmaceutical industry.

It will be understood that this invention is not limited to the above-described embodiments. Those skilled in the art having the benefit of the teachings of the present invention as hereinabove set forth, can effect numerous modifications thereto. These modifications are to be construed as being encompassed with the scope of the present invention as set forth in the appended claims.

What is claimed is:

1. A homogenization device comprising:
    a housing, the housing defining a flow-through chamber having an upstream portion, a downstream portion and an inner surface;
    an inlet port comprising an inlet valve for introducing liquid into the upstream portion of the flow-through chamber;
    a baffle element, the baffle element being disposed coaxially within the flow-through chamber, the baffle element being moveable within the flow-through chamber between the upstream portion and the downstream portion; and
    a local constriction positioned between the baffle element and the inner surface of the flow-through chamber to provide fluid communication between the upstream portion and the downstream portion of the flow-through chamber,
    wherein the inlet valve is capable of actuating between an open position and a closed position and the inlet valve being actuated to the closed position as the baffle element moves in an upstream direction.

2. The homogenization device of claim 1, wherein the flow-through chamber is cylindrical.

3. The homogenization device of claim 1, wherein the inlet valve is a suction valve.

4. The homogenization device of claim 1, further comprising a discharge valve for discharging fluid from the flow-through chamber.

5. The homogenization device of claim 4, wherein the discharge valve is capable of being actuated to an open position to admit liquid to be discharged from the flow-through chamber as the baffle element moves in a downstream direction.

6. The homogenization device of claim 4, wherein the device comprises a second discharge valve for discharging fluid from the flow-through chamber.

7. The homogenization device of claim 1, wherein the baffle element is mounted on a rod which extends into the flow-through chamber.

8. The homogenization device of claim 7, wherein a reciprocating mechanism is connected to the rod, the reciprocating mechanism being capable of reciprocating the rod within the flow-through chamber.

9. The homogenization device of claim 1, wherein the inlet valve is capable of being actuated to the open position to admit liquid into the flow-through chamber as the baffle element moves in a downstream direction.

10. The homogenization device of claim 1, wherein the device comprises two baffle elements disposed coaxially in the flow-through chamber.

11. The homogenization device of claim 1, wherein the baffle element comprises a structural element selected from the group consisting of: a conical-shaped front upstream surface, a flat front upstream surface, or a front upstream spherical surface.

12. The homogenization device of claim 1, wherein the local constriction is an annular gap between the baffle element and the inner surface of the flow-through chamber, the annular gap having a constant width in the range of 1 micron to 20 mm.

13. The homogenization device of claim 1, wherein the baffle element comprises a flow channel with an orifice in the flow channel, the flow channel providing fluid communication between the upstream portion and the downstream portion of the flow-through chamber.

14. The homogenization device of claim 1, wherein the device comprises a second inlet port having a second inlet valve for introducing liquid into the flow-through chamber.

15. A method of homogenizing a liquid comprising the steps of:
   (a) providing a homogenization device according to claim 1;
   (b) moving the baffle element in a downstream direction away from the inlet valve to actuate the inlet valve into the open position and thereby admitting liquid into the flow-through chamber through the inlet valve;
   (c) moving the baffle element in the upstream direction towards the inlet valve to pressurize the liquid in the upstream portion of the flow-through chamber and force the liquid through the local constriction to form cavitation bubbles downstream of the local constriction, wherein the movement of the baffle element in the upstream direction actuates the inlet valve from the open position to the closed position.

* * * * *